United States Patent
Jung et al.

(10) Patent No.: US 7,898,613 B2
(45) Date of Patent: Mar. 1, 2011

(54) BACKLIGHT UNIT AND LIQUID CRYSTAL DISPLAY DEVICE COMPRISING LIGHT GUIDE PANEL HAVING PRISM PATTERNS

(75) Inventors: Sang Won Jung, Busan (KR); Ki Won Kim, Gympo-si (KR)

(73) Assignee: LG Display Co., Ltd., Seoul (KR)

( * ) Notice: Subject to any disclaimer, the term of this patent is extended or adjusted under 35 U.S.C. 154(b) by 165 days.

(21) Appl. No.: 11/454,715

(22) Filed: Jun. 16, 2006

(65) Prior Publication Data

US 2007/0109464 A1    May 17, 2007

(30) Foreign Application Priority Data

Nov. 16, 2005    (KR) .................. 10-2005-0109704

(51) Int. Cl.
*G02F 1/1335*    (2006.01)
*F21V 7/04*    (2006.01)

(52) U.S. Cl. ............... 349/62; 349/64; 349/65; 362/613; 362/619; 362/620

(58) Field of Classification Search ............ 349/62, 349/64, 65; 362/613, 619, 620
See application file for complete search history.

(56) References Cited

U.S. PATENT DOCUMENTS

| | | | | |
|---|---|---|---|---|
| 5,886,759 | A * | 3/1999 | Mashino et al. | 349/65 |
| 6,100,952 | A * | 8/2000 | Marvin et al. | 349/62 |
| 6,612,722 | B2 * | 9/2003 | Ryu et al. | 362/331 |
| 6,700,634 | B2 * | 3/2004 | Taniguchi et al. | 349/65 |
| 6,921,178 | B2 * | 7/2005 | Ohkawa | 362/620 |
| 7,066,634 | B2 * | 6/2006 | Kitamura et al. | 362/616 |
| 2003/0174492 | A1 * | 9/2003 | Ohkawa | 362/31 |
| 2004/0145914 | A1 | 7/2004 | Yu et al. | |
| 2004/0264911 | A1 | 12/2004 | Toeda et al. | |
| 2005/0073828 | A1 * | 4/2005 | Ha | 362/31 |

FOREIGN PATENT DOCUMENTS

| | | |
|---|---|---|
| CN | 1478187 | 2/2004 |
| JP | 6-3526 | 1/1994 |
| JP | 2000-193825 A | 7/2000 |
| JP | 2002-040260 | 2/2002 |
| JP | 2005-63912 A | 3/2005 |

OTHER PUBLICATIONS

Notification of the First Office Action for corresponding Chinese Patent Application Serial No. 200610083154.7, dated Dec. 28, 2007.
Office Action issued in corresponding Japanese Patent Application No. 2006-163187; mailed Oct. 14, 2008.
Office Action issued in corresponding Japanese Patent Application No. 2006-163187 (Appeal No. 2009-23782); issued Jun. 23, 2010.
Search Report issued in corresponding French Patent Application No. 0605128; issued Jul. 8, 2010.

* cited by examiner

*Primary Examiner* — Mark A Robinson
*Assistant Examiner* — Paisley L Arendt
(74) *Attorney, Agent, or Firm* — Brinks Hofer Gilson & Lione

(57) ABSTRACT

Provided is a backlight unit that increases brightness and increases uniformity of the brightness. The backlight unit includes a plurality of point light sources. A light guide panel includes a first surface that receives incident light from the point light sources. A second surface is where the lights from the point light sources cross. Prism patterns are formed on the first surface.

6 Claims, 11 Drawing Sheets

BACKLIGHT UNIT AND LIQUID CRYSTAL DISPLAY DEVICE COMPRISING LIGHT GUIDE PANEL HAVING PRISM PATTERNS

This application claims the benefit of the Korean Patent Application No. P2005-0109704 filed on Nov. 16, 2005 that is hereby incorporated by reference.

BACKGROUND

1. Field

A backlight unit that is increases brightness and increases uniformity of the brightness is provided.

2. Related Art

Conventionally, there has been an increased trend in using liquid crystal display devices because of the appealing characteristics, such as lightness, thinness, low driving power consumption, etc. The liquid crystal display device has been used in office automation equipment, audio/video equipment, etc. The liquid crystal display device controls the transmitted amount of a light beam in accordance with a signal applied to a plurality of control switches that are arranged in a matrix shape, thereby displaying a desired picture on a screen.

The liquid crystal display device is not a self luminous display device, it requires a separate light source such as a backlight.

The backlight unit is classified as a direct type or an edge type in accordance with the location of a light source. The edge type backlight has a light source installed at the edge of one side of a liquid crystal display device and irradiates an incident light from the light source to a liquid crystal display panel through a light guide panel and a plurality of optical sheets. The direct type backlight has a plurality of light sources disposed right under the liquid crystal display device and irradiates the incident light from the light sources to the liquid crystal display panel through a diffusion plate and a plurality of optical sheets.

FIG. 1 represents one example of a backlight unit adopting LED (light emitting diode).

Referring to FIG. 1, a backlight unit of the related art includes a plurality of LED's 11 acting as point light source; and a light guide panel which converts light from the LED's 11 into a surface light to irradiate to a liquid crystal display panel.

The backlight unit, as shown in FIG. 1, has brightness that appears higher where the lights incident from the LED's 11 to a light guide panel 12 cross than in other parts of the guide. A bright spot occurs where the light from the different LED's 11 cross in the light guide panel 12. The bright spot appears in the shape of a ring, circle or ellipse, and is known as a "hot spot" in accordance with the shape. Due to this phenomenon, in the backlight unit and the liquid crystal display device of the related art, the brightness of the display picture is non-uniform because part of the guide panel 12 appears to be brighter in the display picture. FIG. 2 is a result of measuring the brightness on the light guide panel in the backlight unit as in FIG. 1. In FIG. 2, the brightest part, which is labeled the "HOT SPOT," corresponds to the part 13, in FIG. 1, where the light from the different LED's 11 cross paths in the light guide panel 11.

SUMMARY OF THE INVENTION

Accordingly, it is an object of the present invention to provide a backlight unit that is adaptive for increasing brightness and increasing uniformity of the brightness.

A backlight unit includes a plurality of point light sources. A light guide panel includes a first surface that receives incident light from the point light sources. A second surface is included where the lights from the point light sources cross. Prism patterns form on the first surface.

In the backlight unit, a plurality of minute protrusion patterns are formed in the second surface.

A backlight unit includes a plurality of point light sources. A light guide panel includes a first surface that receives incident light from the point light sources. A second surface has a predetermined area where the lights from the point light sources cross and prism patterns are formed on the first surface. The second surface is formed between the first surface and the point light sources.

In the backlight unit, the second surface has a plurality of minute protrusion patterns disposed in high density on an area adjacent to the point light sources and disposed in low density on the predetermined area.

The backlight unit includes a plurality of optical sheets including at least one diffusion sheet and at least one prism sheet to control the light from the light guide panel. A reflection sheet is also included that reflects the light incident from lower and side surfaces of the light guide panel to the light guide panel.

The backlight unit includes a plurality of optical sheets including at least one diffusion sheet and at least one prism sheet to control the light from the light guide panel. A reflection sheet reflects the light incident from lower and side surfaces of the light guide panel to the light guide panel.

A liquid crystal display device according to still another aspect includes a backlight unit inclusive of a plurality of point light sources and a light guide panel that converts a light from the point light source into a surface light. A liquid crystal display panel modulates the light irradiated from the backlight unit by applying an electric field to a liquid crystal, thereby displaying a picture. The light guide panel includes a plurality of point light sources and a light guide panel includes a first surface that receives incident light from the point light sources, and a second surface where the lights from the point light sources cross and prism patterns formed on the first surface.

In the liquid crystal display device, a plurality of minute protrusion patterns are formed in the second surface.

A liquid crystal display device according to still another embodiment includes a backlight unit inclusive of a plurality of point light sources and a light guide panel that converts a light from the point light source into a surface light. A liquid crystal display panel modulates the light irradiated from the backlight unit by applying an electric field to a liquid crystal, thereby displaying a picture. The light guide panel includes a plurality of point light sources and a light guide panel that includes a first surface that receives incident light from the point light sources, and a second surface that has a predetermined area where the lights from the point light sources cross and prism patterns are formed on the first surface. The second surface is formed between the first surface and the point light sources.

In the liquid crystal display device, the second surface has a plurality of minute protrusion patterns disposed in high density on an area adjacent to the point light sources and disposed in low density on the predetermined area.

In the liquid crystal display device, the backlight unit includes a plurality of optical sheets that have at least one diffusion sheet and at least one prism sheet and control the light from the light guide panel. A reflection sheet reflects the light incident from lower and side surfaces of the light guide panel to the light guide panel.

In the liquid crystal display device, the backlight unit includes a plurality of optical sheets that include at least one diffusion sheet and at least one prism sheet to control the light from the light guide panel. A reflection sheet reflects the light incident from lower and side surfaces of the light guide panel to the light guide panel.

BRIEF DESCRIPTION OF THE DRAWINGS

The embodiments that are illustrated in the Drawings are meant for exemplary purposes only. Other embodiments will become obvious to those skilled in the art. In the Drawings.

DESCRIPTION

Reference will now be made in detail to the preferred embodiments, examples of which are illustrated in the accompanying drawings.

Figure 1:
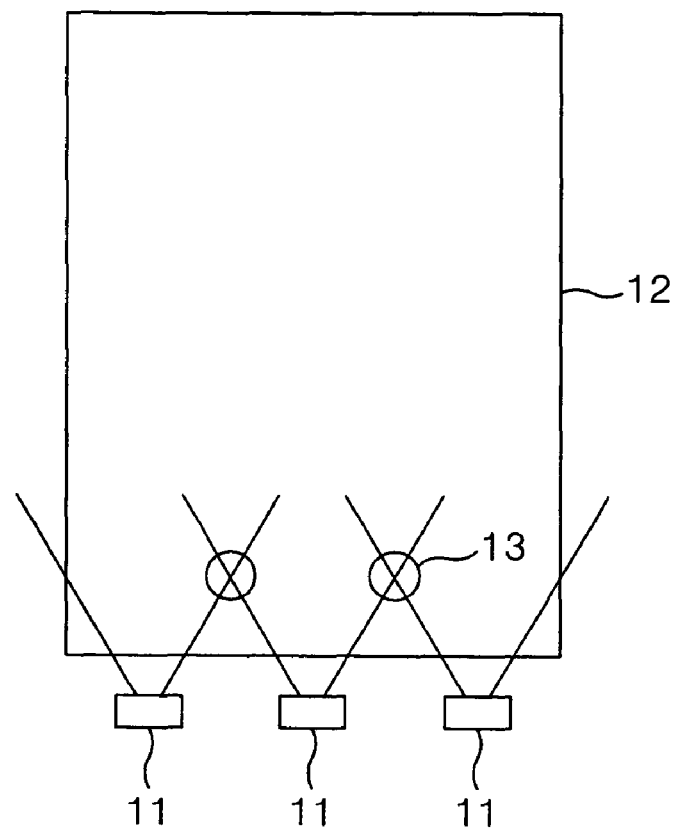
FIG. 1 is a diagram representing a light guide panel and light emitting diodes in a backlight unit of the related art.
Figure 2:
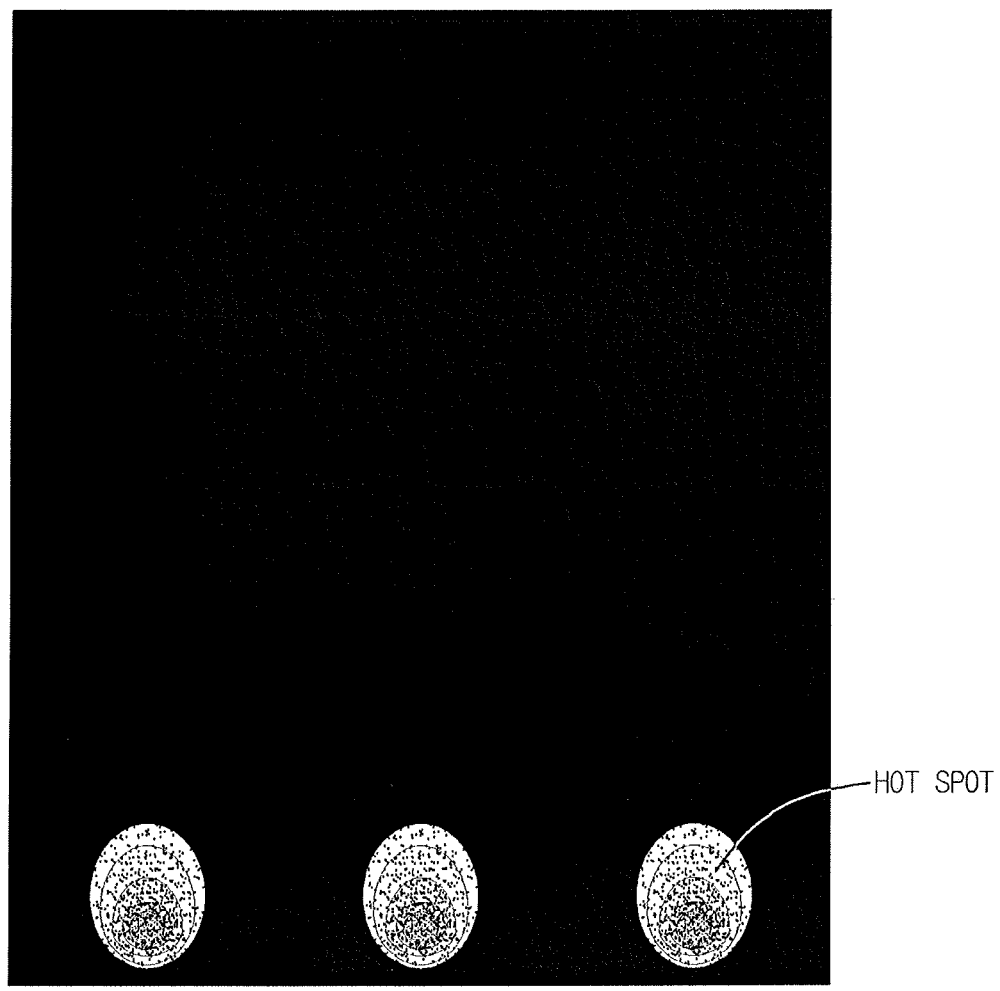
FIG. 2 is an experimental result diagram representing a bright spot where lights cross in the backlight unit of FIG. 1.
Figure 3:
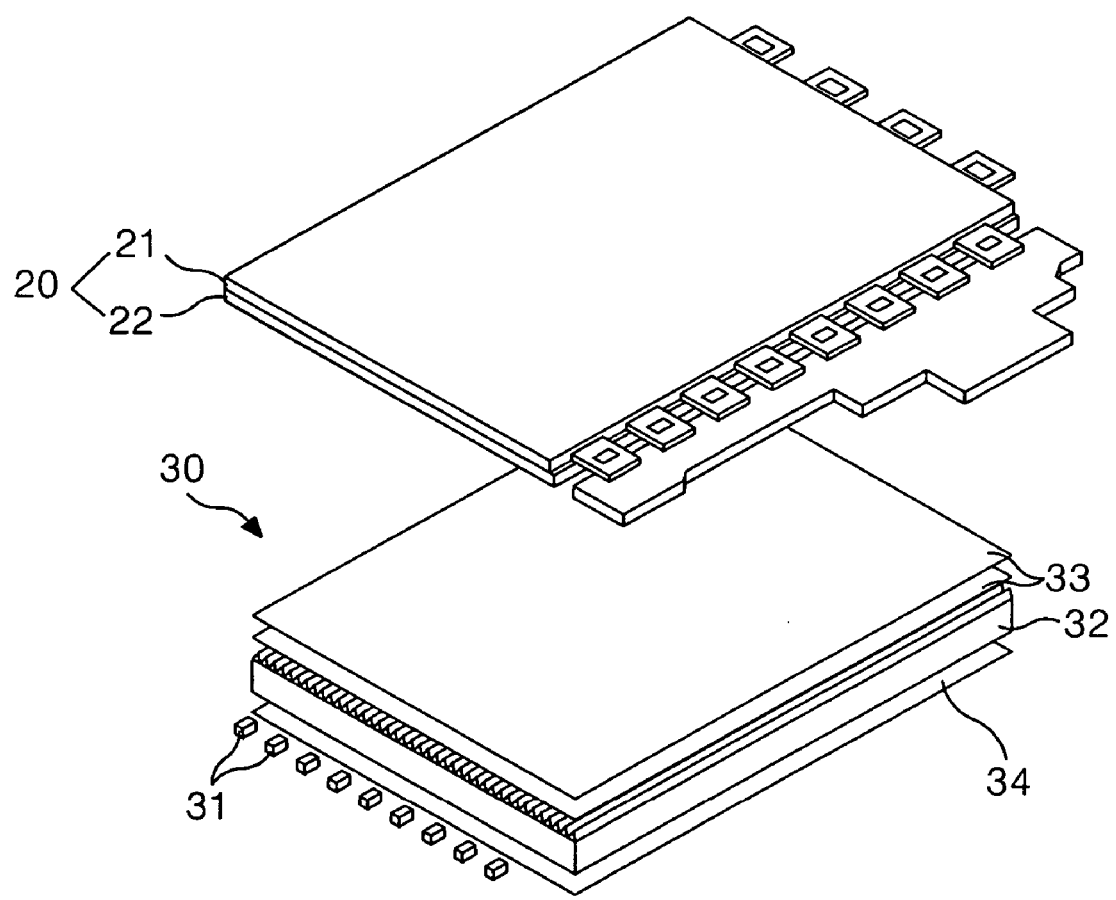
FIG. 3 is a perspective plan view representing a liquid crystal display device and a backlight unit.
Figure 4:
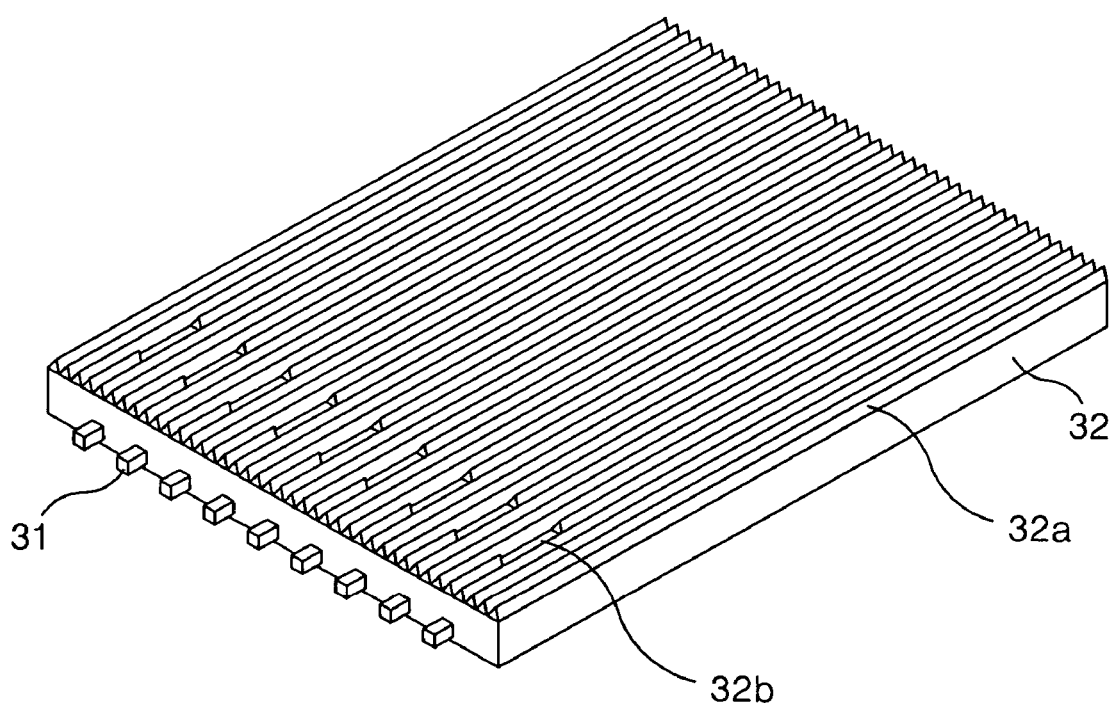
FIGS. 4 and 5 are diagrams representing prism patterns in the light guide panel shown in FIG. 3.
Figure 5:
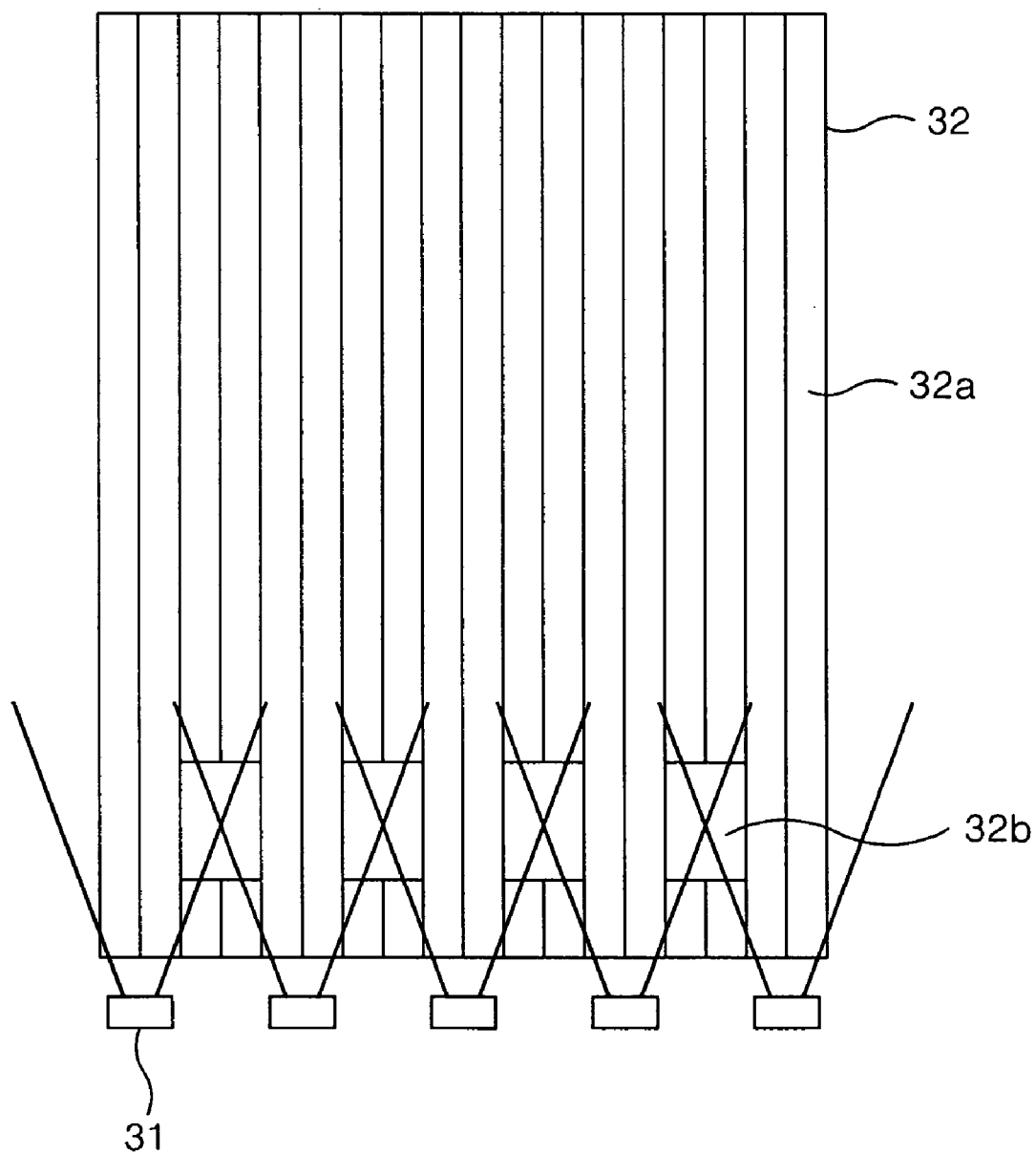

Referring to FIGS. 3 to 5, a liquid crystal display device includes a liquid crystal display panel 20; and a backlight unit that irradiates light to the liquid crystal display panel 20.

A liquid crystal (not shown) is injected between an upper substrate 21 and a lower substrate 22 of the liquid crystal display panel 20. Elements, such as a color filter, a common electrode, a back matrix are formed in the upper substrate 21 of the liquid crystal display panel 20. Signal wire lines, such as a data line and a gate line, are formed in the lower substrate 22 of the liquid crystal display panel 20, and a thin film transistor ("TFT") is formed at a crossing part of the data line and the gate line. The TFT switches a data signal, which is to be transmitted to a liquid crystal cell from the data line, in response to a scan signal (gate pulse) from the gate line. A pixel electrode is formed at a pixel area defined between the data line and the gate line.

The backlight unit 30 includes a plurality of LED's 31 acting as point light source; a light guide panel 32 where prism patterns 32A are formed on an upper surface; optical sheets 33 disposed between the light guide panel 32 and a liquid crystal display panel 20; and a reflection sheet 34 which faces a lower surface of the light guide panel 32.

The light guide panel 32 converts the light from the LED's 31 into a surface light to irradiate to the optical sheets 33. The prism patterns 32A, formed in the light guide panel 32, refract the light progressing to the optical sheets 33 from the light guide panel 32. The light is refracted in a vertical direction to the surfaces of the optical sheets 33 to increase brightness and light efficiency. Part of the patterns are removed in a part 32B, where the light from the LED's 31 cross. This is done to lower the amount of the light exiting from the part 32B and thus no coupling or hot spot phenomenon appears. For example, brightness non-uniformity on the light guide panel 32 is reduced because the light progressing to the optical sheets 33 becomes relatively less in the part 32B where there is no prism pattern.

The optical sheets 33 convert the progress path of the light exiting from the light guide panel 32 and the prism patterns 32A. After the conversion the light is vertical to the liquid crystal display panel 20. The optical sheets then diffuse the light. Thus, the efficiency of the light irradiated to the liquid crystal display panel 20 is increased and the uniformity of light is increased. The optical sheets 33 include one or more prism sheets and one or more diffusion sheets.

The reflection sheet 34 faces the rear and side surfaces of the light guide panel 32 to reflect the light incident from the rear and side surfaces of the light guide panel 32 and thus prevents light leakage and increases light efficiency.

According to the first embodiment the brightness non-uniformity is reduced in comparison to the related art. However, the brightness non-uniformity still exists in part because the light non-uniformly refracts by the prism patterns 32A in the liquid crystal display device Accordingly, a backlight unit according to a second embodiment removes all the prism patterns in the upper surface of the light guide panel near the LED's as in FIGS. 6 and 7.

Figure 6:
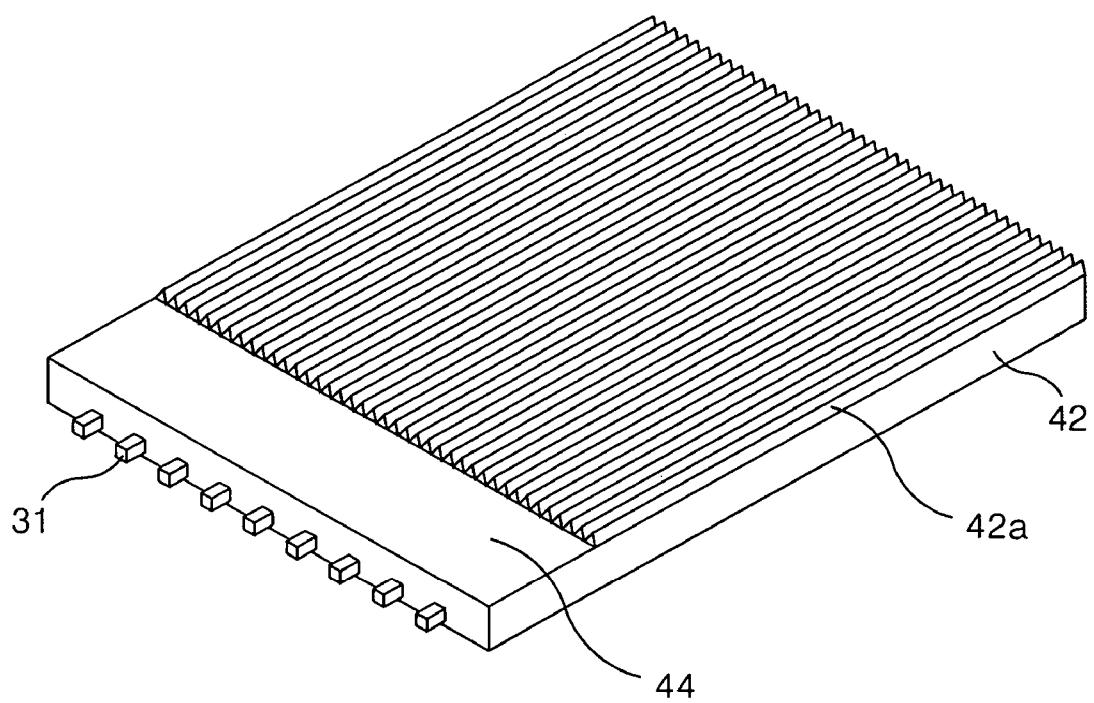
FIGS. 6 and 7 are diagrams representing a backlight unit according to another embodiment.
Figure 7:
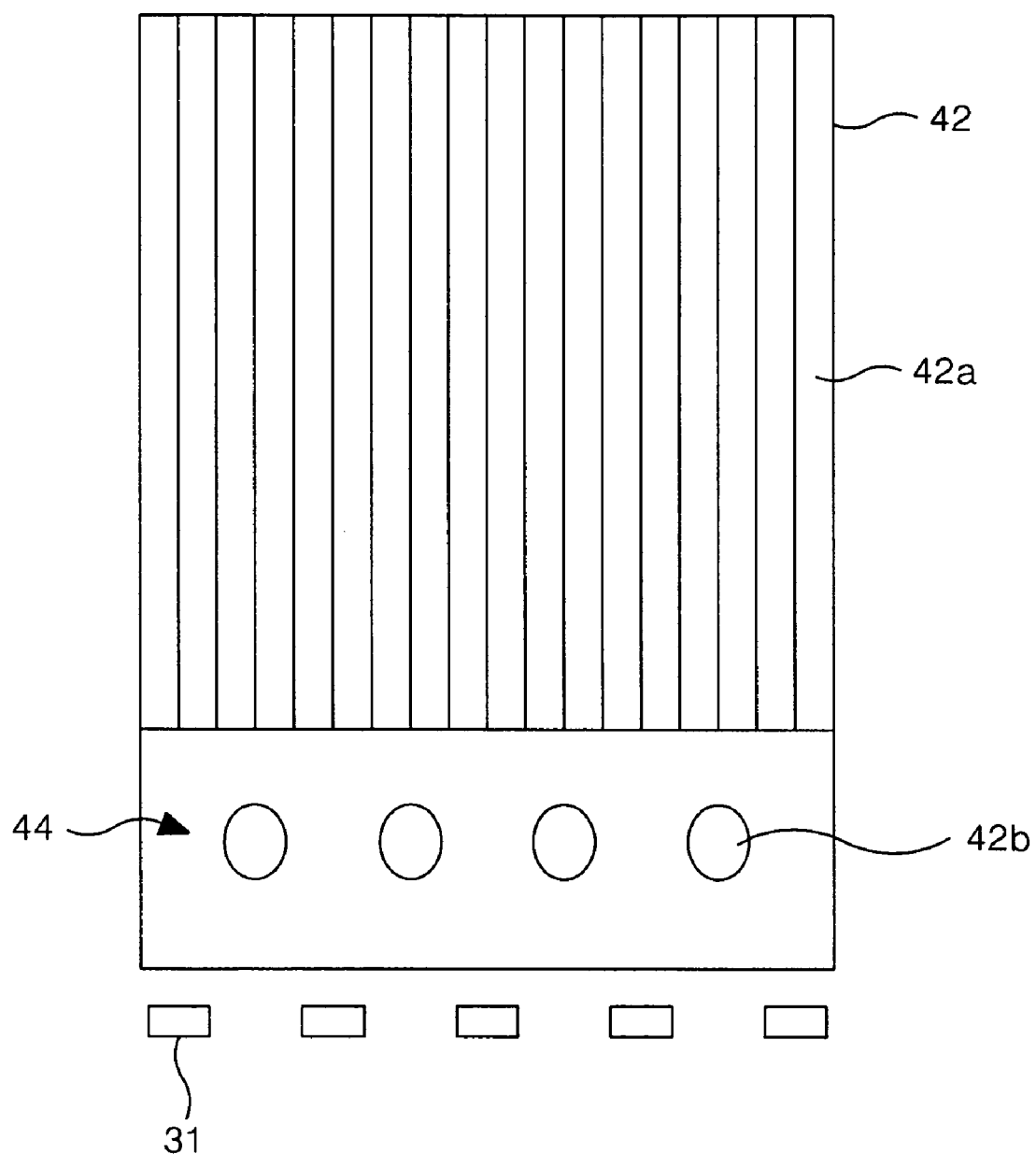

Referring to FIGS. 6 and 7, the backlight unit according to the second embodiment includes a light guide panel 42 where there is a non-pattern part 44 where prism patterns 42A are removed in the upper surface near the LED's 31.

The non-pattern part 44 of the light guide panel 42 is a fixed area inclusive of a part 42B where the light from the LED's 31 cross. It is possible to prevent the light from being non-uniformly refracted by the prism patterns 42A in the part 42B where the lights cross and the vicinity thereof because all the prism patterns 42A are removed. Accordingly, the backlight unit according to the second embodiment lowers the brightness in the part 42B where the light crosses and thus enables the brightness uniformity to increase in light guide panel 42.

Figure 8:
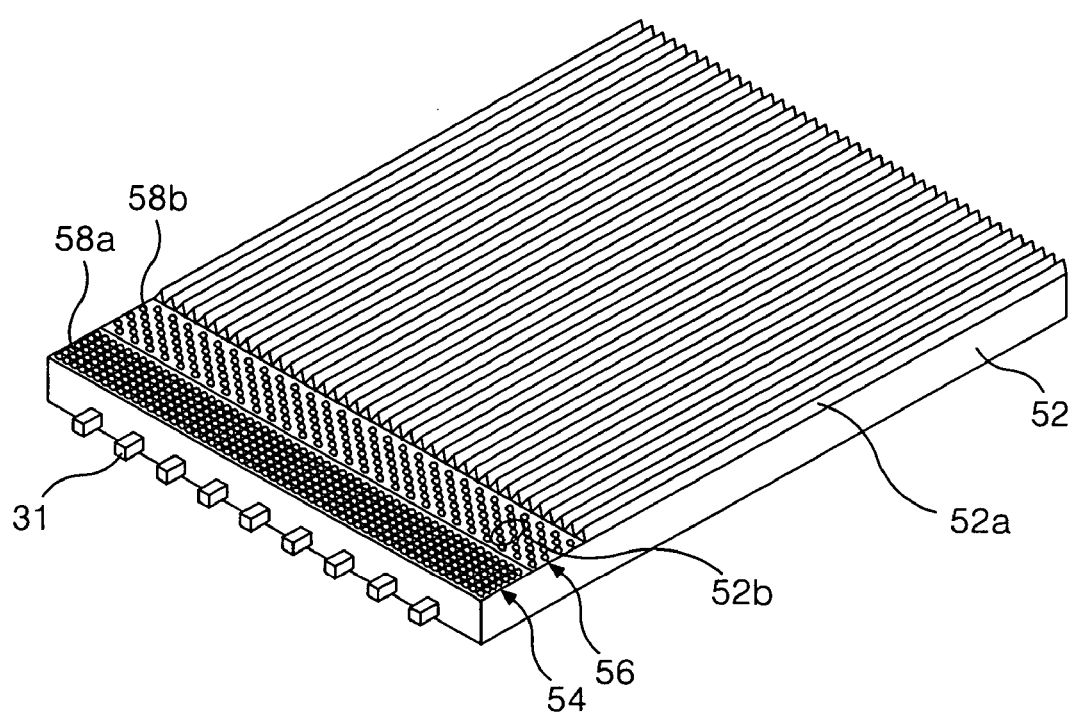
FIGS. 8 and 9 are diagrams representing a backlight unit according to another embodiment.
Figure 9:
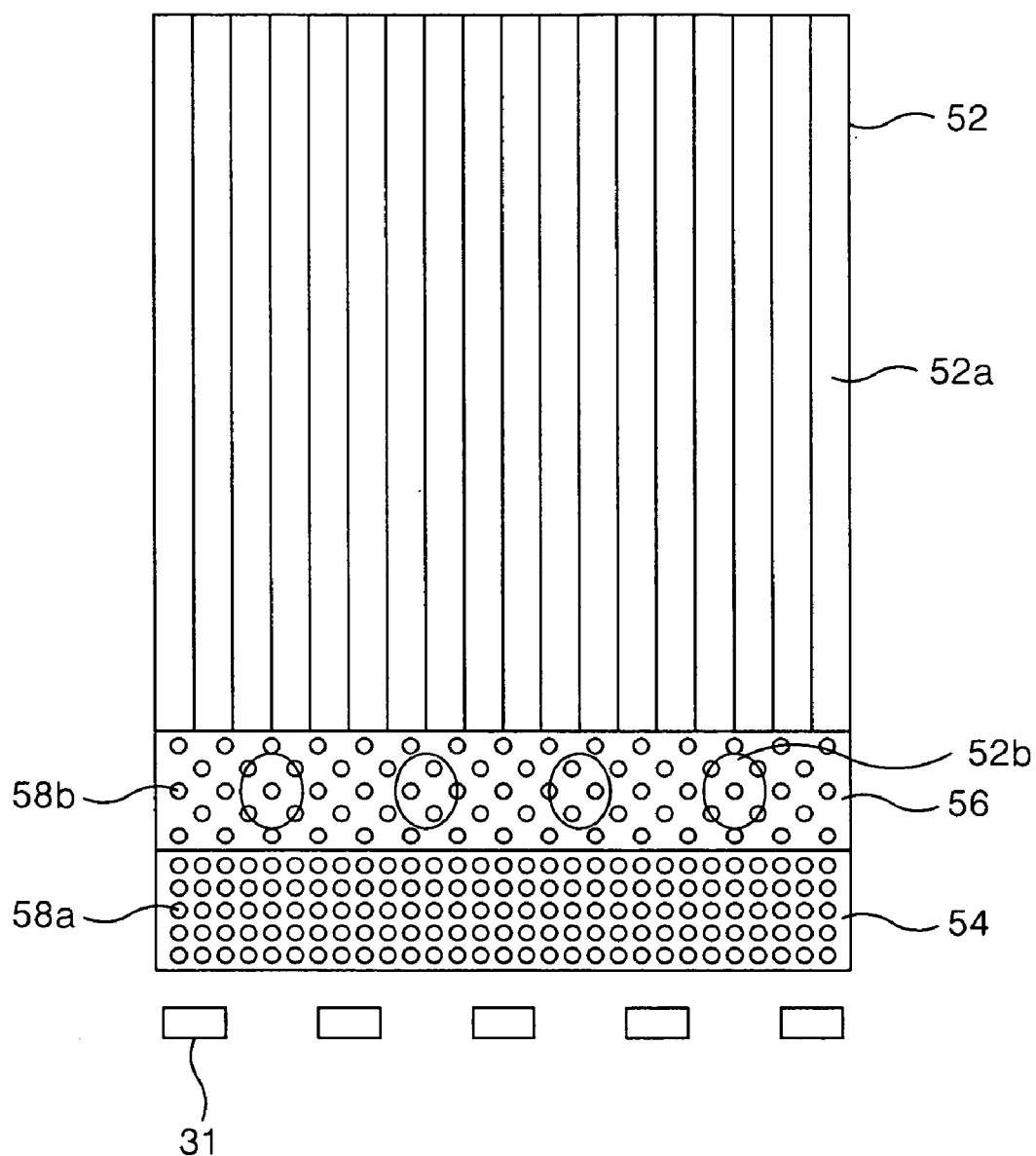

FIGS. 8 and 9 represent a backlight unit according to a third embodiment of the present invention.

Referring to FIGS. 8 and 9, the backlight unit includes a light guide panel 52 where all prism patterns 52A are removed in the upper surface near LED's 31 and minute protrusion patterns 58A, 58B are formed instead. The minute protrusion pattern is called a sand pattern.

The sand patterns 58A, 58B are minute uneven patterns that are formed to be partially different in density in the upper surface of the light guide panel 52 by a sanding treatment. The sand patterns 58A, 58B refract the light incident from the LED's 31 to optical sheets 33. Light progress is increased to the optical sheets 33 as the density of the minute protrusion patterns 58A, 58B gets higher. The minute protrusion patterns 58A are disposed in high density on the light guide panel 52 in a first area 54 before the part 52B where the lights from the LED's 31 cross. However, the minute protrusion patterns 58A are disposed in low density on the light guide panel 52 in a second area 56 that is inclusive of the part 52B where the lights from the LED's 31 cross. Therefore, according to this embodiment, the amount of the light progressing to the optical sheets 33 is decreased in a fixed area inclusive of the part 52B where the lights cross in the light guide panel 52 when compared with the other part. However, the amount of the light progressing to the optical sheets 33 is increased in other part.

Figure 10:
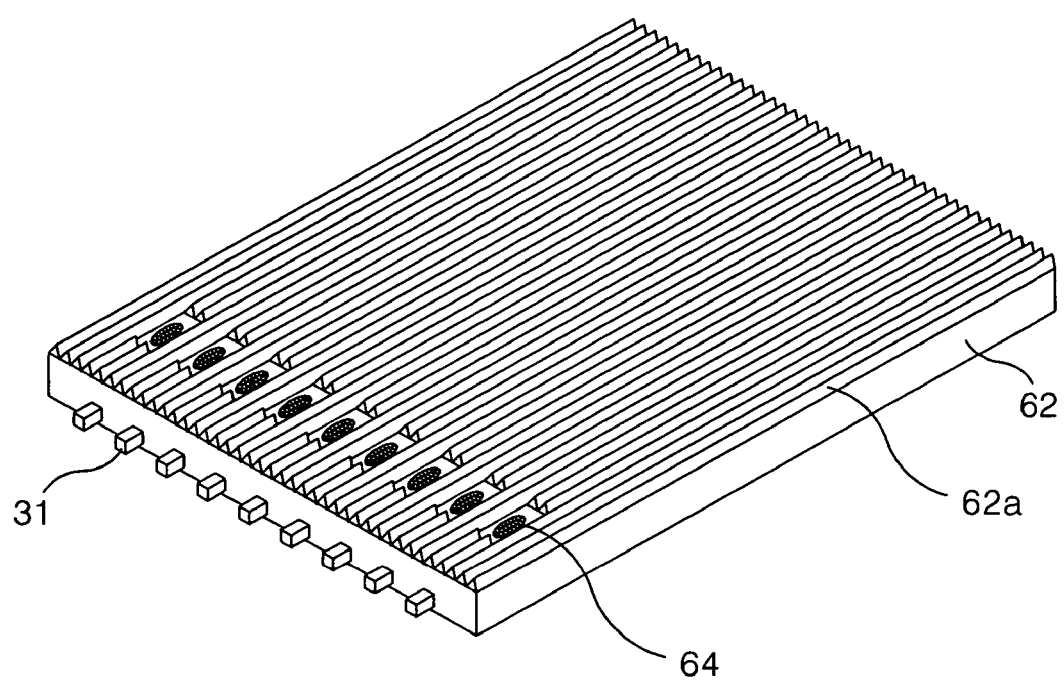
FIGS. 10 and 11 are diagrams representing a backlight unit according to another embodiment.
Figure 11:
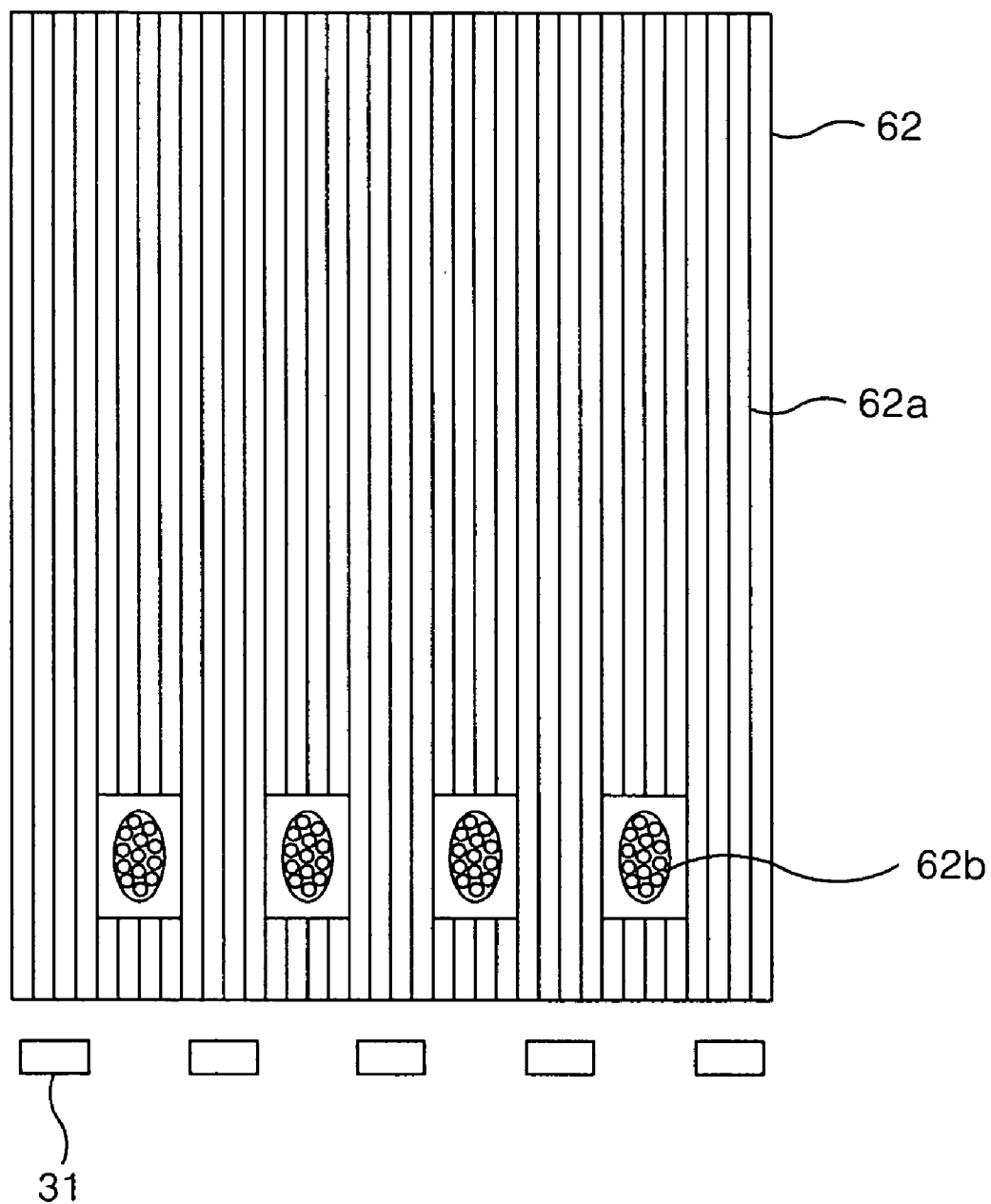

FIGS. 10 and 11 represent a backlight unit according to a fourth embodiment.

Referring to FIGS. 10 and 11, the backlight unit includes a light guide panel 62 where minute protrusion patterns 64 are formed in a fixed area that is inclusive of a part 62B where the lights cross.

In the light guide panel 62 according to the embodiment, the minute protrusion patterns 64 are formed on an upper surface of the fixed area inclusive of the part 62B where the lights cross. However, the prism patterns 62A are formed on most of the other upper surface. The amount of light is reduced in the part 62B where the lights cross by the minute protrusion patterns 64 of low density. The density of the patterns 64 are adjusted so that the brightness uniformity of the part 62B where the lights cross conforms to the brightness uniformity of the remaining other part.

As described above, the backlight unit forms prism patterns on the light guide panel, but removes the prism pattern partially. For example, the prism patterns are removed in the part of the upper surface of the light guide panel corresponding to the part where the lights cross or does a haze treatment by lowering the density of the minute protrusion patterns. Thus, it possible to reduce the brightness that is excessively high in the part where the lights cross. As a result, the backlight unit and the liquid crystal display device using the same forms the prism pattern on the light guide panel. Thus, the brightness of the light guide panel is uniform as well the brightness of the light guide panel.

Although embodiments have been shown in the drawings and described above, it should be understood to the ordinary skilled person in the art that the invention is not limited to the embodiments, but rather that various changes or modifications thereof are possible without departing from the spirit of the invention. Accordingly, the scope shall be determined only by the appended claims and their equivalents.

What is claimed is:

1. A backlight unit, comprising:
   a plurality of point light sources; and
   a light guide panel that includes a first portion and a plurality of second portions,
   wherein the first portion has prism patterns,
   wherein the plurality of second portions is where the lights from the point light sources cross and does not have the prism patterns, and
   wherein a plurality of minute protrusion patterns are formed in the second portions,
   wherein the first portion is positioned on an upper surface of the light guide panel,
   wherein the plurality of second portions are positioned at predetermined intervals on the upper surface of the light guide panel, and
   wherein the plurality of second portions has a rectangular shape and is surrounded by the first portion.

2. The backlight unit according to claim 1, further comprising:
   a plurality of optical sheets that includes at least one diffusion sheet and at least one prism sheet that diffuse the light from the light guide panel; and
   a reflection sheet that reflects the light incident from lower and side surfaces of the light guide panel.

3. The backlight unit according to claim 1, wherein the plurality of second portions has a plurality of sand patterns with minute uneven patterns in different densities.

4. A liquid crystal display device, comprising:
   a backlight unit that is inclusive of a plurality of point light sources and a light guide panel that converts a light from the point light sources into a surface light; and
   a liquid crystal display panel that modulates the light irradiated from the backlight unit by applying an electric field to a liquid crystal, thereby displaying a picture,
   wherein the light guide panel includes a first portion and a plurality of second portions,
   wherein the first portion has prism patterns,
   wherein the plurality of second portions is where the lights from the point light sources cross and does not have the prism patterns, and
   wherein a plurality of minute protrusion patterns are formed in the second portions,
   wherein the first portion is positioned on an upper surface of the light guide panel,
   wherein the plurality of second portions are positioned at predetermined intervals on the upper surface of the light guide panel, and
   wherein the plurality of second portions has a rectangular shape and is surrounded by the first portion.

5. The liquid crystal display device according to claim 4, wherein the backlight unit includes:
   a plurality of optical sheets that have at least one diffusion sheet and at least one prism sheet and diffuse the light from the light guide panel; and
   a reflection sheet that reflects the light incident from lower and side surfaces of the light guide panel.

6. The liquid crystal display device according to claim 4, wherein the plurality of second portions has a plurality of sand patterns with minute uneven patterns in different densities.

\* \* \* \* \*